United States Patent [19]

Sasaki et al.

[11] Patent Number: 5,070,422
[45] Date of Patent: Dec. 3, 1991

[54] MAGNETIC TAPE BACK TENSION DEVICE FOR MAGNETIC RECORDING-REPRODUCTION SYSTEM

[75] Inventors: Yoshikazu Sasaki, Osaka; Takaaki Oohara, Hyogo; Masahiko Takada, Osaka, all of Japan

[73] Assignee: Sanyo Electric Co., Ltd., Osaka, Japan

[21] Appl. No.: 514,604

[22] Filed: Apr. 26, 1990

[30] Foreign Application Priority Data

Apr. 29, 1989 [JP] Japan .................................. 1-110772
Aug. 14, 1989 [JP] Japan .................................. 1-210493

[51] Int. Cl.$^5$ ...................... G11B 5/027; G11B 15/48
[52] U.S. Cl. ..................................... 360/85; 360/74.3; 360/96.3
[58] Field of Search ................ 360/85, 84, 95, 96.3, 360/74.3

[56] References Cited

U.S. PATENT DOCUMENTS 4,984,105  1/1991  Hwang .................................. 360/85
4,992,895  2/1991  Kim ..................................... 360/96.5

*Primary Examiner*—John H. Wolff
*Attorney, Agent, or Firm*—Stanger, Michaelson, Spivak & Wallace

[57] ABSTRACT

A magnetic tape back tension device in a magnetic recording-reproduction system having a band brake mechanism for lightly applying a braking force to a supply reel support, the band brake mechanism comprising a brake release lever rotatably mounted on a chassis, a band brake having one end attached to the brake release lever, reeved around the supply reel support and attached at the other end thereof to a tape tension maintaining mechanism, and a spring for biasing the brake release lever into rotation in a brake applying direction, and further having a control plate slidably provided on the chassis, the control plate comprising a first contact face movable into contact with the lever biasing spring by the sliding movement of the control plate toward a mode change position to free the brake release lever from the force of the spring, and a second contact face movable into contact with the brake release lever by the sliding movement to rotate the lever in a brake slackening direction.

6 Claims, 6 Drawing Sheets

MAGNETIC TAPE BACK TENSION DEVICE FOR MAGNETIC RECORDING-REPRODUCTION SYSTEM

FIELD OF INDUSTRIAL APPLICATION

The present invention relates to a back tension device for lightly tensioning a magnetic tape to prevent the tape from slackening for use in magnetic recording-reproduction systems wherein the direction of travel of the magnetic tape as wound around a head cylinder can be changed as desired from forward to reverse and vice versa while reproducing picture on a display.

BACKGROUND OF THE INVENTION

When video signals are to be read from a tape by a rotating video head in magnetic recording-reproduction systems (hereinafter referred to as "VTRs"), the tape must be caused to travel at a specified speed while being tensioned suitably.

In the following description, the expression "forward travel (drive) of the tape" means the transport of the tape from the supply reel side toward the take-up reel side via the head cylinder, and the expression "reverse travel (drive) of the tape" refers to the transport of the tape in a direction opposite to the forward direction, i.e., from the take-up reel side toward the supply reel side via the head cylinder.

Further the application of a brake to the supply reel support does not mean to stop the supply reel support by the brake but to apply a light braking action to the support to hold the tape tensioned.

Usually, the tape is caused to travel by rotating the reel support on the tape take-up side by the capstan motor, which therefore generally serves also as the motor for the reel support.

The tape as held between the capstan and a pinch roller has the speed of its travel controlled by the rotation of the pinch roller.

Further when the tape is caused to travel forward, it is practice to lightly brake the supply reel support by a brake band 41 (see FIG. 8) to hold the tape tensioned during the travel.

To cause the tape to travel reversely, the tape take-up rotation transmitting system is changed over for the supply reel support 12 to thereby drive the supply reel support.

If the brake is acting on the supply reel support at this time, a great rotational torque is required for driving the supply reel support. As shown in FIG. 8, therefore, brake release means has been proposed which comprises a brake release lever 42 having attached thereto one end of the brake band 41 and rotatable clockwise by the rightward movement of a control plate 2 through a lever 49 to release the supply reel support 12 from the brake band (Examined Japanese Utility Model Publication SHO 61-25080).

When the tape T traveling forward is to be driven reversely upon a change of mode, the supply reel support is temporarily rendered free for a period of time required for a change-over of the mechanical rotational system by a known swing idler mechanism, permitting a back tension lever 31 to withdraw the tape from the supply reel undesirably. This poses a serious problem in the case of VTRs having the edition function of accurately and quickly searching the frames for the desired image for reproduction or accurately setting the tape at the recording start point and end point.

Further with the conventional device shown in FIG. 8, the brake is actuated or released by moving the brake release lever 42 counterclockwise or clockwise through the sliding movement of the control plate 2. Accordingly, if the plate 2 is slidingly moved leftward after the tape has been driven reversely with the brake in a released state, the brake acts on the supply reel support 12 abruptly, giving rise to a trouble such as displacement or slackening of the tape.

SUMMARY OF THE INVENTION

An object of the present invention is to provide a magnetic recording-reproduction system wherein even when the supply reel support is released from the brake for changing the direction of travel of the tape from forward to reverse, the tape is held under suitable tension by a back tension lever and can nevertheless be prevented from being withdrawn from the supply reel.

Another object of the present invention is to provide a device wherein when the brake is to be applied to the supply reel support again for traveling the tape in the forward direction after the tape has been driven reversely with the supply reel support released from the brake, the braking force can be applied to the reel support gradually to obviate tape troubles.

DESCRIPTION OF THE PREFERRED EMBODIMENT

The present invention will be described below with reference to the drawings for a better understanding of the invention, so that the description and the drawings should not be interpreted as limiting the scope of the invention.

Although the embodiment of the invention to be described below is a household magnetic recording-reproduction system known as a video tape recorder (VTR), the invention can of course be embodied as a recording-reproduction system for magnetic tapes having sound signals or data signals recorded thereon.

Figure 1:
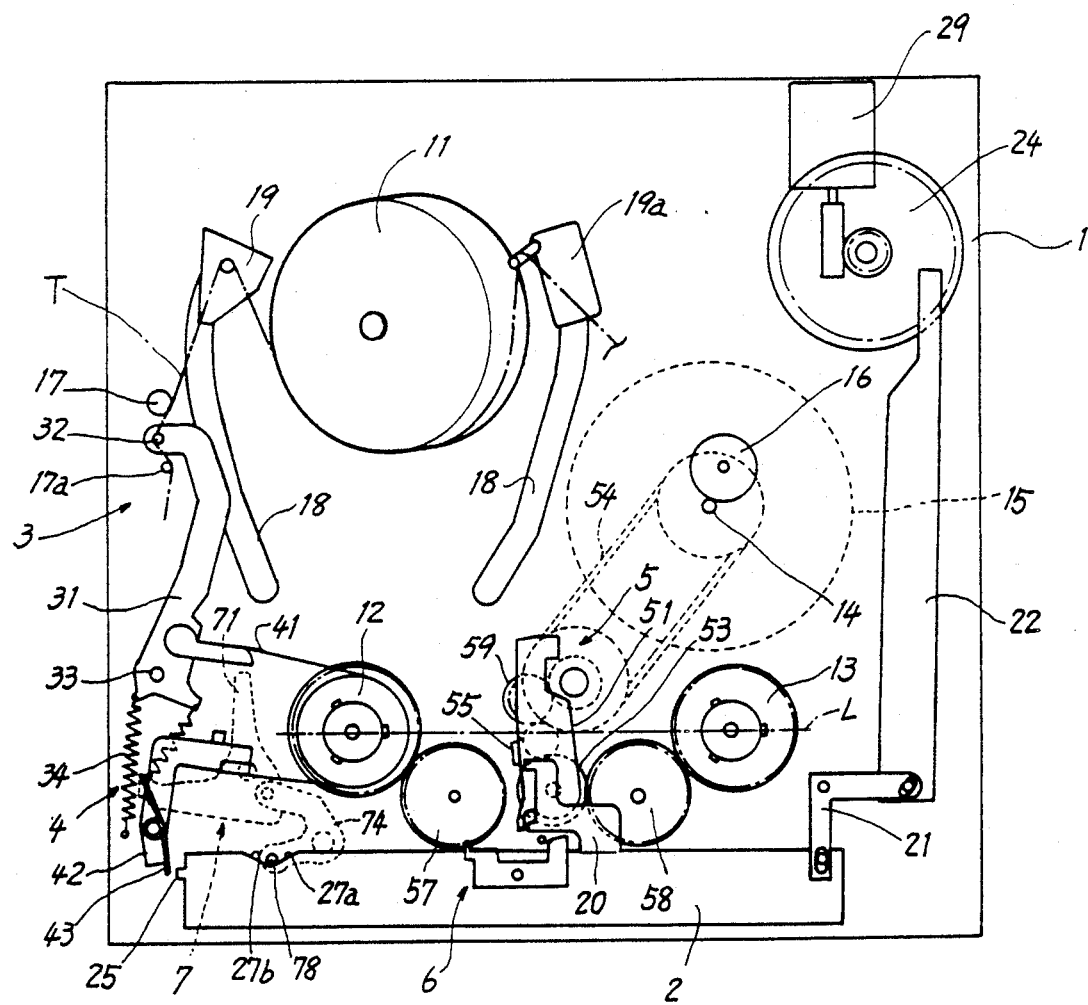
FIG. 1 is a plan view of a VTR embodying the invention.

FIG. 1 shows mechanisms of the VTR as simplified with those irrelevant to the invention omitted and with a tape T in forward travel.

Arranged on a chassis 1 are a head cylinder 11, supply reel support 12, take-up reel support 13, capstan 14, capstan motor 15 and pinch roller 16 as already known. Between the supply reel support 12 and opposite sides of the head cylinder 11, a pair of tape leading guides 19, 19a are provided slidably along guide grooves 18, 18.

A swing idler mechanism 5 and a mechanism 6 for preventing reverse rotation of the supply reel support 12 are arranged between the reel support 12 and the take-up reel support 13.

A control plate 2 parallel to a phantom line L through the supply reel support 12 and the take-up reel support 13 is slidably provided on the chassis 1. As is already known, the control plate 2 is coupled to a mode change motor 29 by an intermediate lever 21, auxiliary control plate 22 and positive cam 24. The plate 2 is slidingly movable to predetermined positions corresponding to different modes to selectively operate the parts concerned as will be described later.

A band brake mechanism 4 coupled to the supply reel support 12 has a tape tension maintaining mechanism 3 coupled thereto as already known.

According to the present invention, a tape tension reducing mechanism 7 is interposed between the tension maintaining mechanism 3 and the control plate 2.

When a tape cassette (not shown) is loaded on both the supply and take-up reel supports 12, 13, the tape is withdrawn from the cassette and wound around the head cylinder 11 by the leading guides 19, 19a.

The tape travels forward in recording mode, usual reproduction mode, fast forward reproduction mode, slow forward reproduction mode and frame forward reproduction mode.

The tape travels reversely in reverse reproduction mode, fast reverse reproduction mode, slow reverse reproduction mode and reverse frame transport mode.

With the VTR described above, the capstan motor 15 serves also as a motor for driving the supply and take-up reel supports 12, 13.

In the recording and various reproduction modes mentioned, the tape T travels as nipped between the capstan 14 and the pinch roller 16 when the direction of travel of the tape T is changed.

The constructions and operations of the mechanisms will be described below.

Band Brake Mechanism and Tape Tension Maintaining Mechanism

With reference to FIG. 1, a back tension lever 31 and a brake release lever 42 are arranged on the left side of the supply reel support 12. The lever 42 is provided between the lever 31 and the control plate 2. A brake band 41 reeved around the supply reel support 12 over approximately one-half of its circumference has one end attached to the base end of the back tension lever 31 and the other end attached to a free end of the brake release lever 42.

The back tension lever 31 is movable about a pivot 33 and biased counterclockwise by a back tension tensile spring 34 to pull the brake band 41.

Figure 2A:
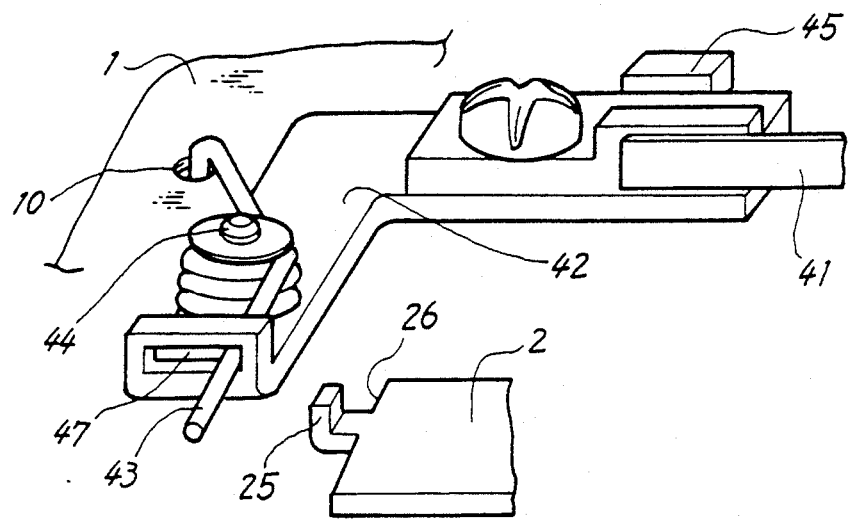
FIGS. 2A, 2B and 2C are enlarged perspective views showing how a control plate is brought into engagement with a band brake mechanism.

As seen in FIG. 2A, the brake release lever 42 is biased counterclockwise by a torsion spring 43 into contact with a stopper 45 on the chassis 1.

The torsion spring 43 has one end engaged in a hole 10 in the chassis 1, is wound around a pivot 44 for the brake release lever 42 and has the other end extending outward through a slot 47 formed at the base end of the lever 42.

By being biased by the torsion spring 43, the brake release lever 42 pivotally moves counterclockwise into contact with the stopper 45, pulling the brake band 41 to exert a braking force on the supply reel support 12.

The control plate 2 has at its left end a first contact portion 25 opposed to the other end of the torsion spring 43 projecting beyond the brake release lever 42, and a second contact portion 26 opposed to the base end of the release lever 42.

While the tape T is in forward travel, the first and second contact portions 25, 26 are away from the torsion spring 43 and the brake release lever 42 (FIGS. 1 and 2A).

Figure 2B:
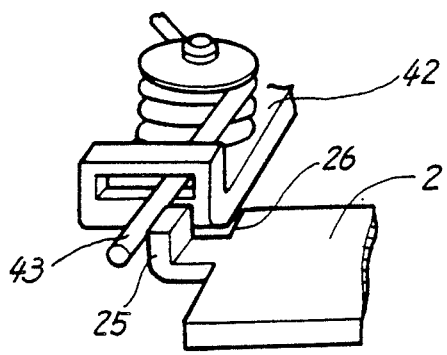

When the direction of travel of the tape T is to be changed from forward to reverse, the brake mechanism 4 operates in the following order. During leftward sliding movement of the control plate 2, the first contact portion 25 projecting from the left end of the control plate 2 pushes the projecting end of the torsion spring 43 to free the brake release lever 42 (FIG. 2B).

Figure 2C:
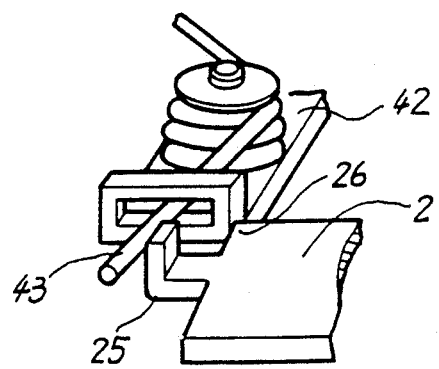

When the control plate 2 further slides along leftward, the second contact portion 26 of the control plate 2 comes into direct pushing contact with the release lever 42 and moves the lever 42 clockwise to slacken the brake band 41 (FIG. 2C). In this state, the direction of travel of the tape T is changed.

During the forward travel of the tape T, the back tension tensile spring 34 holds the tension lever 31 biased counterclockwise, holding the tape under suitable tension. If the tape T slackens, the lever 31 draws the tape T in between fixed guides 17, 17a on the chassis 1 to eliminate the slack to hold the tape tensioned.

When the tape T is to be wound on the supply reel by reversely rotating the supply reel support 12 by switching the engagement of the mechanical rotation system, the brake release lever 42 is pushed by the control plate 2 and thereby rotated clockwise to slacken the brake band 41 as stated above, so that little or no braking force acts on the supply reel support 12, which in turn winds up the tape without being loaded by the brake band 41.

Alternatively when the direction of travel of the tape is changed from reverse to forward, the braking mechanism 4 operates reversely. With the return movement of the control plate 2, the pressure of the control plate first contact portion 25 on the torsion spring 43 first decreases, permitting the force of the torsion spring to act on the release lever 42 gradually and to move the release lever 42 counterclockwise as the control plate 2 moves away from the lever 42, whereby the supply reel support 12 is gradually braked. The tape then resumes the forward travel as seen in FIG. 1.

In this way, the brake release lever 42 is prevented from moving counterclockwise instantaneously under the action of the spring 43. This prevents the brake band 41 from acting on the supply reel support 12 abruptly and also from rotating the back tension lever 31 clockwise abruptly, consequently precluding the tape from slackening markedly to obviate the disturbance of images due to improper contact of the tape with the magnetic head.

Back Tension Reducing Mechanism 7

Although it is desirable that the tape be subjected to the same tension during the forward travel and during the reverse travel, the tape tension as adjusted by the tension maintaining mechanism 3 is greater during the reverse travel than during the forward travel.

The back tension reducing mechanism 7 coacts with the tape tension maintaining mechanism 3 to equalize the tension in forward travel of the tape with that in the reverse travel to the greatest possible extent.

Arranged under the chassis 1 between the back tension lever 31 and the control plate 2 are a back tension reducing lever 71 and an intermediate lever 74 each generally in a V-shape. The two levers 71, 74 are movable with the sliding movement of the control plate 2.

Figure 3A:
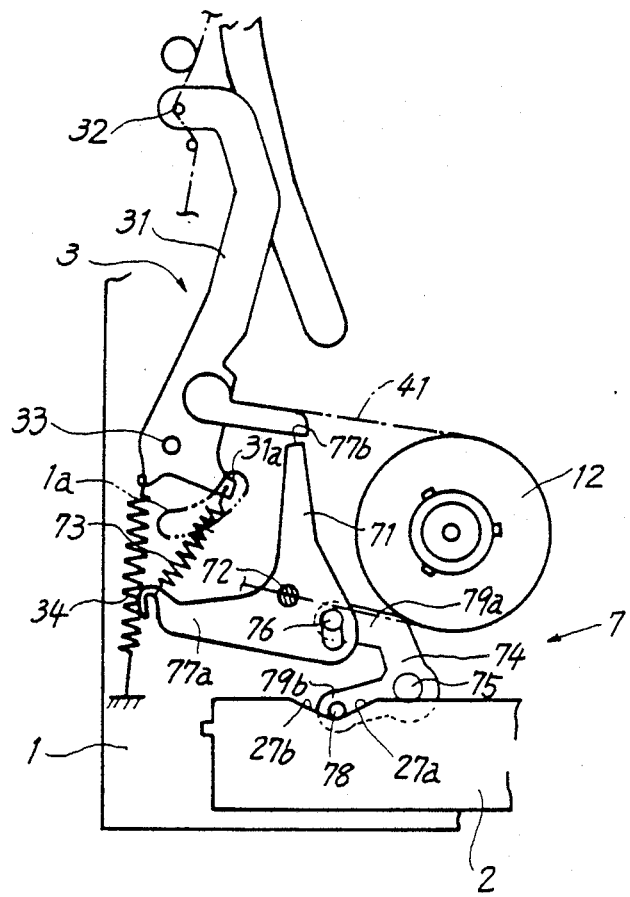
FIGS. 3A and 3B are enlarged plan views showing the control plate in engagement with a back tension reducing mechanism.

With reference to FIG. 3A, the tension reducing lever 71 is movable about a pivot 72 and has a first free end 77a which is coupled to the back tension lever 31 by a tension spring 73.

The back tension lever 31 has a spring connecting lug 31a which is bent downward and extends through a slot 1a formed in the chassis 1 to project below the chassis 1 as seen in FIG. 3A. The spring 73 is in engagement with the lug 31a.

The spring connecting lug 31a of the tension lever 31 is positioned on the path of counterclockwise movement of a second free end 77b of the back tension reducing lever 71.

The intermediate lever 74 has a first free end 79a carrying a pin 76, which is slidably fitted in a slot formed in the tension reducing lever 71 in the vicinity of the pivot 72 thereof.

The intermediate lever 74 has a second free end 79b carrying a projecting pin 78 which extends through an aperture in the chassis 1 shown in FIG. 1 to project above the chassis.

The control plate 2 is formed with a first cam face 27a for pushing the projecting pin 78 on the intermediate lever 74 to move this lever clockwise, and a second cam face 27b formed on the left side of the first cam face and projecting beyond the first cam face for similarly moving the intermediate lever 74.

During the forward travel of the tape T, the projecting pin 78 on the intermediate lever 74 is in a recess between the first cam face 27a and the second cam face 27b of the control plate 2 as shown in FIG. 3A.

In this state, the back tension reducing spring 73 is allowed to have its free length, and the back tension reducing mechanism 7 produces no influence on the tape tension.

The leftward sliding movement of the control plate 2 for changing the direction of travel of the tape from forward to reverse causes the projecting pin 78 on the intermediate lever 74 of the mechanism 7 to come into contact with the first cam face 27a of the control plate 2, thereby moving the intermediate lever 74 clockwise about its pivot 75, whereby the back tension reducing lever 71 is rotated counterclockwise about the pivot 72.

This movement stretches the back tension reducing spring 73, and the spring stretching force acts against the tension spring 34 of the back tension lever 31 to attenuate the force exerted by a back tension post 32 on the tape T.

Figure 3B:
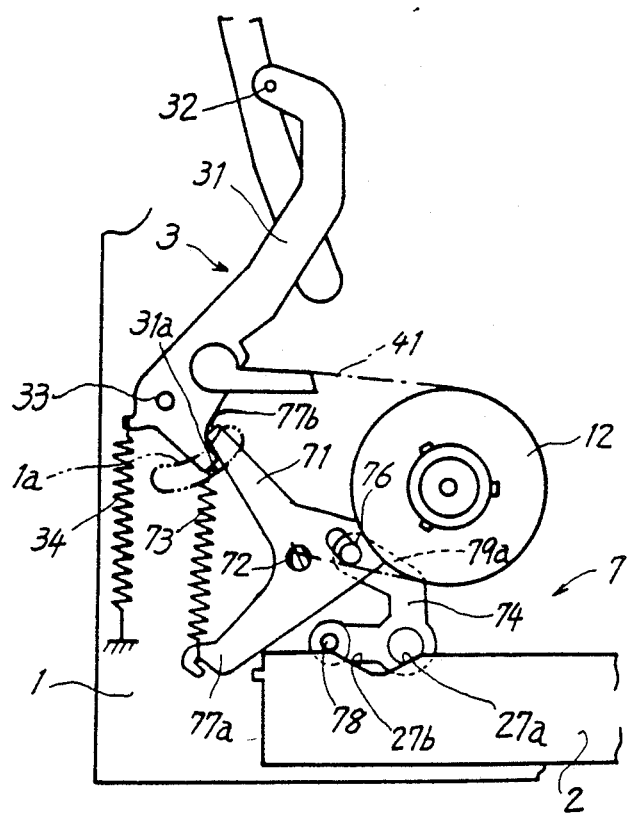

When the tape reeved around the cylinder 11 is to be accommodated in the unillustrated cassette on the reel supports by a tape unloading operation, the control plate 2 slides along rightward, causing the projecting pin 78 on the intermediate lever 74 to ride on the second cam face 27b and rotating the lever 74 clockwise to a great extent. With this movement, the back tension reducing lever 71 rotates counterclockwise through a large angle to cause the second free end 77b of the lever 71 to push the spring connecting lug 31a of the back tension lever 31, whereby the lever 31 is moved clockwise about the pivot 33 to position the free end of the lever 31 on the path of movement of the tape leading guide 19 as seen in FIG. 3B.

Consequently, the leading guide 19, while moving toward the supply reel support 12, pushes the back tension lever 31 clockwise to a position where the lever 31 allows the tape T to be accommodated in the cassette free of interference.

Swing Idler Mechanism 5

Figure 4:
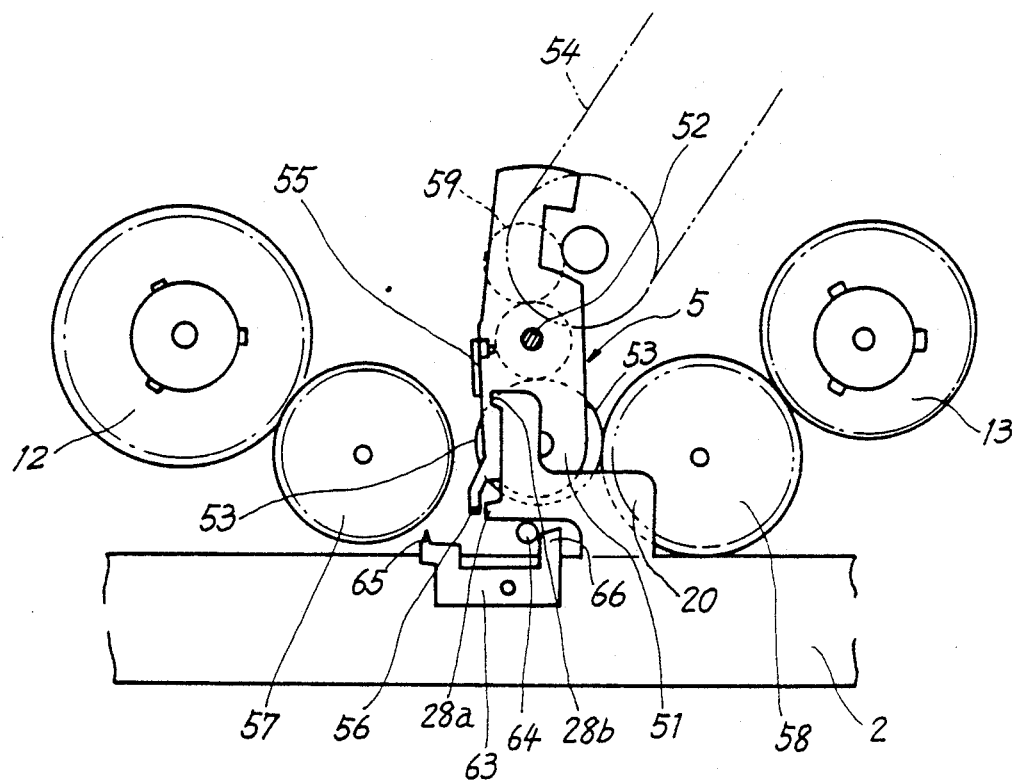
FIG. 4 is an enlarged plan view of a swing idler mechanism.
Figure 5:
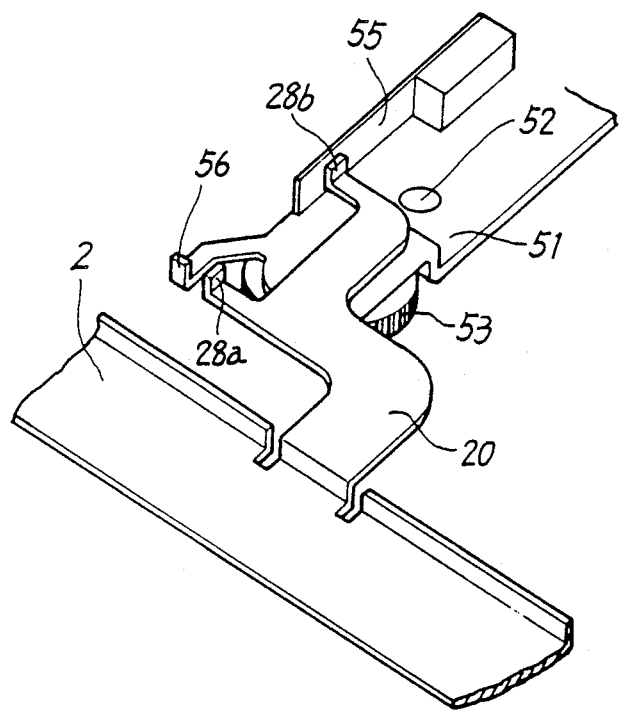
FIG. 5 is a perspective view of the same.

As is already known, the swing idler mechanism 5 shown in FIGS. 1 and 4 comprises a swing lever 51 provided between the supply reel support 12 and the take-up reel support 13, and an intermediate gear 57 or 58 disposed between each of the reel supports and the lever 51.

The swing lever 51 is provided with an idler gear 53, which is coupled to the capstan motor 15 via a gear train 59 and a belt 54.

A change in the direction of rotation of the capstan motor 15 produces a rotational friction force between the swing lever 51 and the idler gear 53, causing the lever to swing about a pivot 52 to mesh the idler gear 53 with one of the intermediate gears 57, 58 selectively, whereby the supply reel support 12 or the take-up reel support 13 is driven in the tape winding direction.

A plate spring 55 attached to the swing lever 51 has a base end secured to the lever 51 and a free end directed toward the idler gear 53.

The idler gear carrying end of the swing lever 51 has a lug 56 extending forward beyond the plate spring 55 and formed by being bent.

The control plate 2 is formed with a bent piece 20 extending toward the swing lever 51. The bent piece 20 has a first projection 28a and a second projection 28b which are formed by being bent upward and engageable with the lug 56 and the plate spring 55, respectively.

FIGS. 1 and 4 show the swing idler mechanism 5 as positioned during the forward travel of the tape T. The swing lever 51 is inclined toward the take-up reel support 13, with the idler gear 53 in mesh with the intermediate gear 58 for the take-up reel support.

The first and second projections 28a, 28b of the control plate 2 are immediately before coming into contact with the lug 56 of the swing lever 51 and the plate spring 55, respectively.

When the direction of travel of the tape T is to be changed from forward to reverse, the capstan motor 15 temporarily stops, and in the meantime, the control plate 2 slides along leftward, causing the first projection 28a thereof to push the lug 56 on the swing lever 51 and thereby forcibly moving the swing lever 51 clockwise.

This immediately moves the idler gear 53 away from the intermediate gear 58 out of meshing engagement therewith. At this time, the second projection 28b of the control plate 2 is also in pushing contact with the plate spring 55.

As the swing lever 51 moves further clockwise, the lug 56 moves out of contact with the first projection 28a, but the second projection 28b of the control plate 2 singly remains in pushing contact with the plate spring 55.

As the control plate 2 slides along further leftward, the swing lever 51 continues its clockwise movement to bring the idler gear 53 into meshing engagement with the intermediate gear 57 adjacent the supply reel support 12.

The swing lever 51 is pushed by the control lever 2 through the plate spring 55, so that if the engagement of the idler gear 53 with the intermediate gear 57 involves an objectionable force or shock, the plate spring 55 warps to absorb the shock. This obviates the possible damage to some teeth of the gears 53, 57.

When the tape T has been completely changed over from the forward travel to the reverse travel, the idler gear 53 is properly in mesh with the intermediate gear 57 by virtue of the sequential operation of the swing idler mechanism 5 described above. The rotation of the capstan motor 15 can therefore be transmitted to the supply reel support 12 for the support 12 to wind up the reversely driven tape T.

When the direction of travel of the tape T is to be changed from reverse to forward, the control plate 2 moves slidingly rightward before the direction of rotation of the capstan motor 15 changes.

Further when the reverse travel is to be changed over to the forward travel, the swing lever 51 pivotally moves counterclockwise for the idler gear 53 to mesh with the intermediate gear 58 adjacent the take-up reel support 13. In the meantime, the tape T slackens between the capstan 14 and the take-up reel support 13 owing to delayed winding-up timing, whereas the tape is nipped between the capstan 14 and the pinch roller 16 and therefore will not slacken between the cpastan 14 and the cylinder 11, hence no omission of video signals.

For fast forward/rewinding mode/stop mode, eject mode and like mode changes irrelevant to recording or reproduction, the control plate 2 operates on the right side of the position shown in FIGS. 1 and 4 for the forward travel, so that the first and second projections 28a, 28b of the control plate 2 exert no influence on the swing lever 51, allowing this lever to swing in the usual manner with the rotational torque transmitted from the capstan motor 15.

It is of course possible to use a rubber idler in place of the idler gear and intermediate rollers in place of the intermediate gears for the transmission of torque through frictional contact between the rubber idler and the intermediate rollers.

Mechanism 6 for Preventing Reverse Rotation of Supply Reel Support

Figure 6:
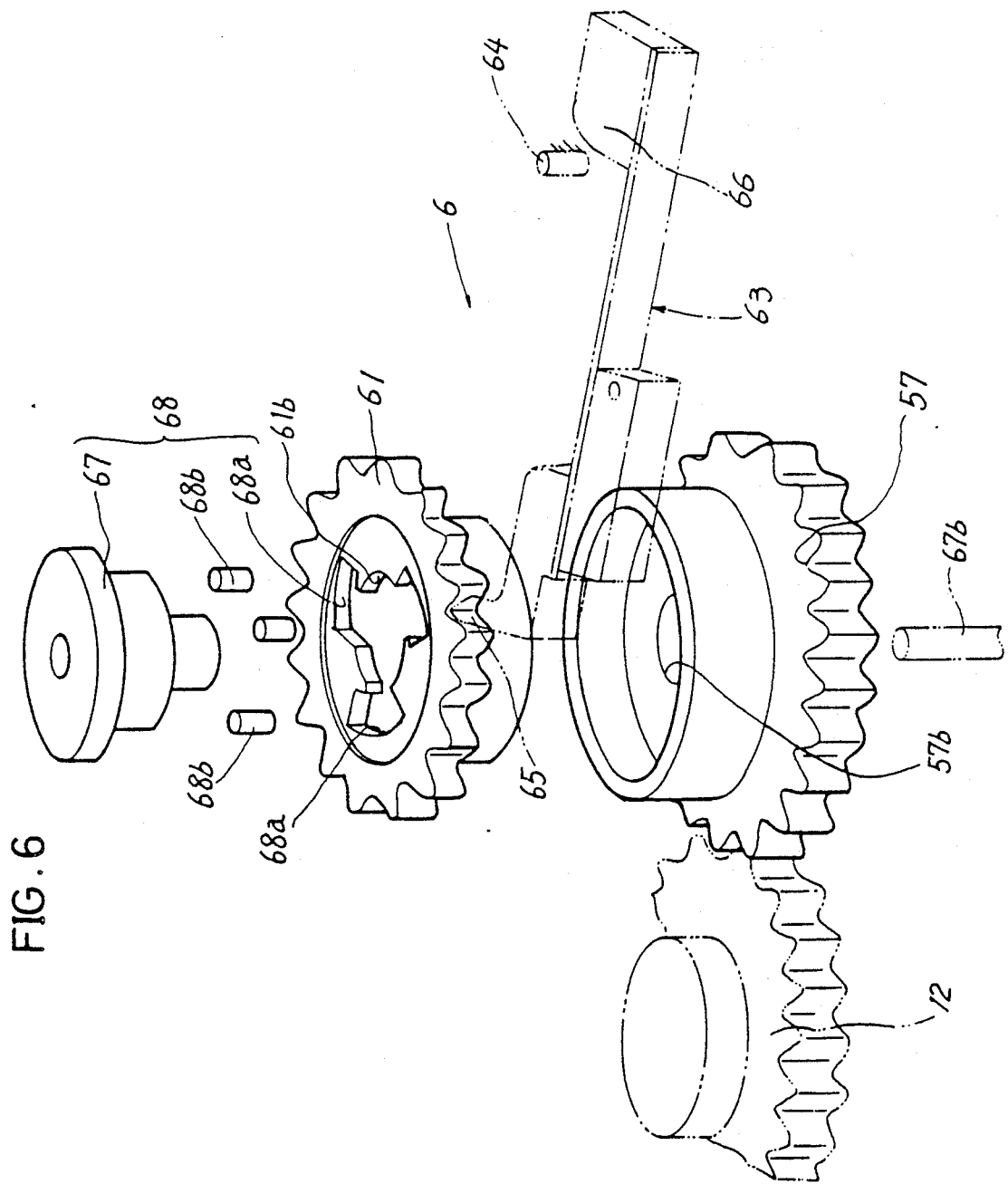
FIG. 6 is an exploded perspective view of a mechanism for preventing reverse rotation of a supply reel support.

With reference to FIG. 6, a lock gear 61 is rotatably mounted on the intermediate gear 57 for the supply reel support 12 coaxially with the gear 57.

The intermediate gear 57 and the lock gear 61 are centrally formed with holes 57b, 61b, respectively. A cylindrical shaft 67 inserted through the hole 61b of the lock gear 61 is intimately fitted in the hole 57b of the intermediate gear 57 and joined to the gear 57. The shaft 67 and the gear 57 thus united are rotatably mounted on a support shaft 67b on the chassis 1.

A one-way clutch 68 is provided between the lock gear 61 and the cylindrical shaft 67. With the lock gear 61 in a locked state, the clutch 68 permits clockwise rotation of the intermediate gear 57 but prevents counterclockwise rotation of the gear 57 as will be described below.

The one-way clutch 68 is of a known construction. The lock gear 61 is formed with three cutouts 68a equidistantly spaced apart around the hole 61b in communication therewith. Three round pins 68b are fitted in the respective cutouts 68a around the cylindrical shaft 67.

Figure 7:
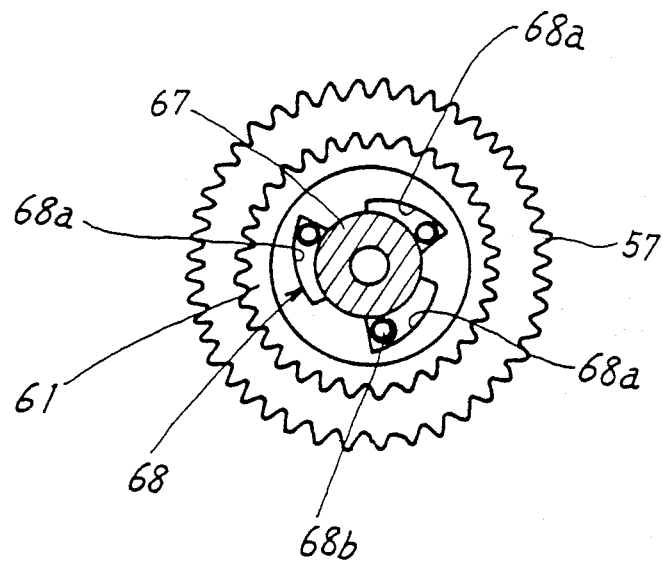
FIG. 7 is a cross sectional view of an intermediate gear for the supply reel support.
Figure 8:
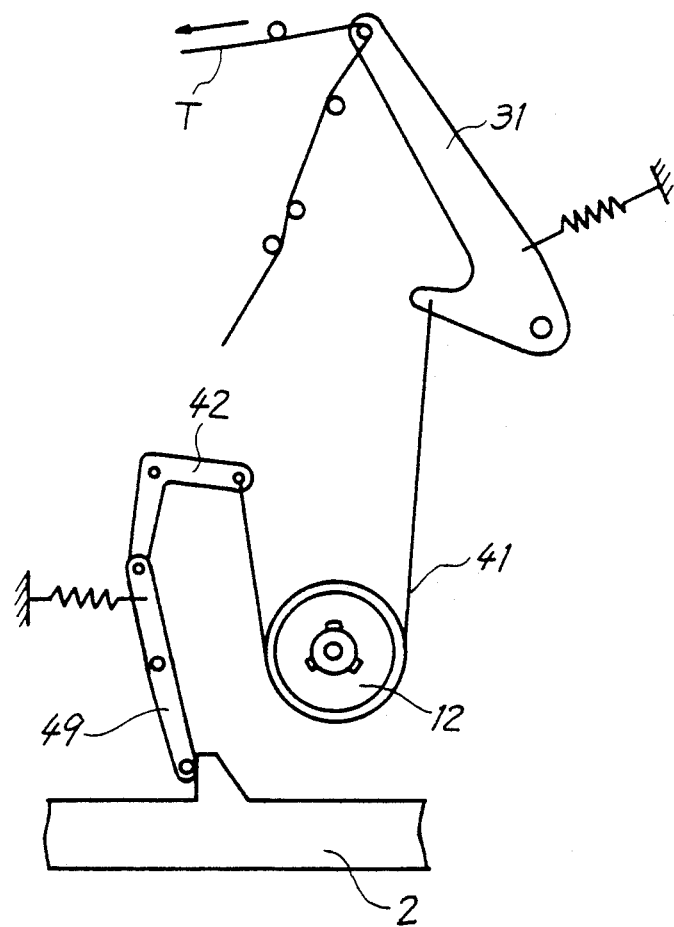
FIG. 8 is a schematic plan view of a conventional device.

With referenct to FIG. 7, each cutout 68a has a depth gradually increasing toward the direction of clockwise rotation of the lock gear 61, relative to the periphery of the shaft 67. At the shallow portion, the depth of the cutout 68a is slightly smaller than the diameter of the pin 68b. At the deep portion, the cutout 68a has a depth slightly greater than the diameter of the pin 68b.

The one-way clutch 68 permits the clockwise rotation of the intermediate gear 57 but prevents the counterclockwise rotation thereof while the lock gear 61 is held locked by the lock lever 63 to be described below. The lock lever 63, serving as means for locking the lock gear 61, is mounted on the control plate 2.

The lock lever 63 has a base portion pivoted to the control plate 2, a lock pawl 65 engageable with the lock gear 61 and projecting from a free end thereof opposed to the lock gear 61, and a contact portion 66 formed at another free end.

A pin 64 is provided on the chassis 1 on the left side of the contact portion 66.

When the direction of transport of the tape T is to be changed from forward to reverse, the leftward sliding movement of the control plate 2 brings the contact portion 66 of the lock lever 63 into contact with the pin 64 as seen in FIG. 4, whereby the lock lever 63 is rotated clockwise to engage the lock pawl 65 with the lock gear 61 and lock the lock gear 61.

In this state, the control plate 2 slides along further leftward, rotating the lock gear 61 and the intermediate gear 57 in the direction in which they are made rotatable together by the one-way clutch 68, whereby the supply reel support 12 is slightly rotated instantaneously in the tape rewinding direction to slightly wind up the tape T and eliminate the slack of the tape due to a delay in the operation of the swing idler mechanism 5.

The supply reel support 12 is prevented from rotating in the tape paying-off direction by the one-way cltuch 68, so that even if the back tension lever 31 is spring-biased to rotate in a direction to draw the tape in between the fixed guides 17, 17a, the tape will not be paid off from the supply reel support 12.

The present invention is not limited to the construction of the foregoing embodiment but can be modified variously within the scope defined in the appended claims.

What is claimed is:

1. In a magnetic recording-reproduction system having arranged on a chassis a head cylinder, a supply reel support and a take-up reel support for causing a magnetic tape withdrawn from one of the reel supports to travel as reeved around the head cylinder, and further having a tape tension maintaining mechanism provided for the path of travel of the magnetic tape, a band brake mechanism for lightly applying a braking force to the supply reel support, a swing idler mechanism selectively engageable with one of the supply reel support and the take-up reel support to transmit the rotation of a motor to the reel support, and a control plate slidably provided on the chassis and engageable with each of said mechanisms to selectively operate the mechanisms, a magnetic tape back tension device characterized in that the band brake mechanism comprises:
    a brake release lever rotatably mounted on the chassis,
    a band brake having one end attached to the brake release lever, reeved around the supply reel support and attached at the other end thereof to the tape tension maintaining mechanism, and
    a spring for biasing the brake release lever into rotation in a brake applying direction,
the control plate having:
    a first contact face movable into contact with the lever biasing spring by the sliding movement of the control plate toward a mode change position to free the brake release lever from the force of the spring, and a second contact face movable into contact with the brake release lever by the sliding movement to rotate the lever in a brake slackening direction, the control plate, when in pushing contact with the brake release lever and the spring to hold the supply reel support released from the brake, being slidable gradually away from the brake release lever to cause the brake to gradually act on the supply reel support.

2. A device as defined in claim 1 wherein the lever biasing spring is a torsion spring having one end engaged with the chassis, wound around a pivot for the lever and retained at the other end thereof on the lever, and the retained end of the torsion spring extends beyond the lever to project into the path of movement of the first contact face of the control plate.

3. A device as defined in claim 1 which further comprises a back tension reducing lever rotatably supported on the chassis, a spring connected between the back tension reducing lever and the tape tension maintaining mechanism, and an intermediate lever rotatably supported on the chassis and in engagement with a cam face on the control plate and with the back tension reducing lever, whereby the back-tensioning action of the tape tension maintaining mechanism is attenuated upon the control plate moving to the position of releasing the supply reel support from the brake.

4. A device as defined in claim 1 wherein the swing idler mechanism comprises a swing lever having a lug, and the control plate is provided with a first projection in close proximity to a position of contact with the lug, the control plate being slidable to cause the first projection to push the lug and thereby forcibly move the swing idler mechanism away from the take-up reel support when the direction of rotation of the supply reel support is to be changed from forward to reverse.

5. A device as defined in claim 4 wherein the swing lever is provided with a plate spring having one end directed toward the control plate, and the control plate is provided with a second projection in close proximity to a position of contact with the plate spring, the control plate being slidable to cause the second projection to push the plate spring and thereby elastically push an idler gear of the swing idler mechanism into meshing engagement with a gear on the supply reel side when the direction of rotation of the supply reel support is to be changed from forward to reverse.

6. A device as defined in claim 1 wherein the supply reel support is operatively connectable to the swing ider mechanism by an intermediate gear disposed at a position engageable with the swing ider mechanism, and the intermediate gear is in engagement with a lock gear rotatably supported on the chassis, through a one-way clutch for preventing the supply reel support from rotating in the winding direction, the control plate being provided with a lock lever projectable to and retractable from a position of contact with the lock gear, a pin being provided on the chassis and engageable with a contact portion projecting from the lock lever to project the lock lever to the contact position when the control plate slidingly moves.

* * * * *